United States Patent
Wu

(10) Patent No.: US 8,526,432 B2
(45) Date of Patent: Sep. 3, 2013

(54) PACKET PROCESSING SYSTEM FOR A NETWORK PACKET FORWARDING DEVICE AND METHOD THEREOF

(75) Inventor: Feng-Chi Wu, Hsinchu (TW)

(73) Assignee: Ralink Technology Corp., Hsinchu (TW)

( * ) Notice: Subject to any disclaimer, the term of this patent is extended or adjusted under 35 U.S.C. 154(b) by 218 days.

(21) Appl. No.: 12/404,507

(22) Filed: Mar. 16, 2009

(65) Prior Publication Data

US 2009/0238183 A1 Sep. 24, 2009

(30) Foreign Application Priority Data

Mar. 21, 2008 (TW) ................................ 97109992 A

(51) Int. Cl.
*H04L 12/28* (2006.01)
*H04L 12/56* (2011.01)
*H04L 12/18* (2006.01)

(52) U.S. Cl.
CPC ................ *H04L 45/16* (2013.01); *H04L 12/18* (2013.01); *H04L 45/00* (2013.01); *H04L 49/201* (2013.01)
USPC ........... 370/390; 370/351; 370/389; 370/392; 370/395.1; 714/749

(58) Field of Classification Search
None
See application file for complete search history.

(56) References Cited

U.S. PATENT DOCUMENTS

| | | | | |
|---|---|---|---|---|
| 6,397,277 B1 * | 5/2002 | Kato et al. | ..................... | 710/104 |
| 6,798,773 B2 * | 9/2004 | Trossen et al. | ................. | 370/390 |
| 7,539,134 B1 * | 5/2009 | Bowes | ........................... | 370/230 |
| 7,870,183 B1 * | 1/2011 | Boivie | ........................... | 709/201 |
| 8,315,255 B1 * | 11/2012 | Casey et al. | .................... | 370/389 |
| 2002/0001310 A1 * | 1/2002 | Mai et al. | ....................... | 370/390 |
| 2002/0027897 A1 * | 3/2002 | Moulsley et al. | ............. | 370/342 |
| 2002/0143951 A1 * | 10/2002 | Khan et al. | ..................... | 709/227 |
| 2002/0181637 A1 * | 12/2002 | Nakabayashi | ................ | 375/358 |
| 2003/0236904 A1 * | 12/2003 | Walpole et al. | ............... | 709/231 |
| 2004/0233907 A1 * | 11/2004 | Hundscheidt et al. | ......... | 370/390 |
| 2005/0068979 A1 * | 3/2005 | Boer et al. | ..................... | 370/445 |
| 2005/0086569 A1 * | 4/2005 | Hiddink et al. | ................ | 714/749 |
| 2005/0100016 A1 * | 5/2005 | Miller et al. | ................... | 370/390 |
| 2006/0007930 A1 * | 1/2006 | Dorenbosch | ................... | 370/390 |
| 2006/0092838 A1 * | 5/2006 | Lee | ................................ | 370/229 |
| 2006/0120312 A1 * | 6/2006 | Yamauchi et al. | ............. | 370/310 |
| 2006/0187885 A1 * | 8/2006 | Roy et al. | ....................... | 370/332 |
| 2006/0198394 A1 * | 9/2006 | Gotoh et al. | ................... | 370/469 |
| 2006/0215561 A1 * | 9/2006 | Wang et al. | .................... | 370/235 |
| 2007/0002858 A1 * | 1/2007 | Bichot et al. | ................... | 370/390 |
| 2007/0076703 A1 * | 4/2007 | Yoneda et al. | ................. | 370/389 |
| 2007/0160046 A1 * | 7/2007 | Matta | ............................. | 370/390 |
| 2007/0211616 A1 * | 9/2007 | Khandekar et al. | ........... | 370/203 |
| 2008/0095058 A1 * | 4/2008 | Dalmases et al. | ............. | 370/237 |
| 2008/0098274 A1 * | 4/2008 | Kwon et al. | .................... | 714/748 |
| 2008/0186896 A1 * | 8/2008 | Fanfelle et al. | ................ | 370/312 |
| 2009/0168681 A1 * | 7/2009 | Moon | ............................ | 370/312 |

\* cited by examiner

*Primary Examiner* — Ayaz Sheikh
*Assistant Examiner* — Peter Chau
(74) *Attorney, Agent, or Firm* — Pearne & Gordon LLP

(57) ABSTRACT

A packet processing system for a network packet delivery device and a method thereof are provided. The packet processing system includes a packet receiving module for receiving packets transmitted from an external device; a packet replication module for replicating the packets received by the packet receiving module, wherein the number of packet replications is determined based on the number of members in the multicast group; a packet modification module for replacing each of destination addresses in frame headers of a media access control of each of the packets replicated by the packet replication module with an address information of each of the members in the multicast group; and a packet transmission module for transmitting the packets, according to the destination addresses, to a packet receiving terminal having an address corresponding to the destination addresses.

18 Claims, 3 Drawing Sheets

PACKET PROCESSING SYSTEM FOR A NETWORK PACKET FORWARDING DEVICE AND METHOD THEREOF

BACKGROUND OF THE INVENTION

1. Field of the Invention

The present invention generally relates to a packet processing system, and more specifically, to a system and method for processing packets.

2. Description of Related Art

Internet has brought about significant impact on human life. Nowadays, the computer networking techniques are evolving from telecommunications connection of physical wired network into telecommunication connection of wireless network, allowing people to surf the Internet freely without being restricted to the physical network wiring.

However, the transmission quality of the wireless network is determined by the transmission media, such as far infrared rays or electromagnetic waves, the environment in which the users are located, such as the distance between base stations, obstructions in the signal transmission route and the material of the obstruction, and other factors.

The above described problems have serious impact on the customers of the wireless network accessing the multicast service provided by the server. The multicast service usually adopts the user datagram protocol (UDP), which is connectionless oriented. The server that uses the above mentioned communications protocol is dedicated to sending multimedia packets only and is not responsible for guaranteeing that the multimedia packets are successfully received by the client terminal (members in the multicast group established by the multicast service). In addition, the IEEE 802.11 wireless communications protocol does not provide any mechanism to ensure clients in the multicast group to successfully receive multicast packets. Thus, when the client is located in a place with weak wireless signals but intends to use a multimedia multicast service such as Video on Demand (VOD), video conference, or distant learning, factors such as weak wireless signals may cause the client a failure in receiving the multimedia multicast packets transmitted to the client by a multimedia server, thus leading to a low quality viewing of such multimedia program on the client side.

In order to allow all the clients to receive multicast packets, in the modern technology, the multicast packet transmission mode of an Access Point (AP) selects the lowest transmission rate of all the supported speeds as the multicast packet transmission rate. In this method, the lowest transmission rate is more tolerant to greater noise interference and has a longer transmission distance. Therefore, the probability that all clients in the multicast group successfully receive multicast packets can be increased. However, many factors must be taken into consideration in terms of determining whether a network packet can be successfully delivered to the client. The method described herein is still unable to ensure proper delivery of multicast packets to the client as well as the multimedia broadcasting quality on the client side.

In addition, the client with the slowest transmission rate in a multicast group puts a burden on the overall transmission rate of the multicast group of the Access Point. This causes other clients to leave a large amount of bandwidths idle due to the presence of the client having the slowest transmission rate, even if they have a large amount of bandwidths available for multimedia multicast packet transmission. Further, since a slower transmission rate is selected, the viewing quality of the multimedia file is then lowered. Accordingly, it has become a highly urgent issue to overcome the above described disadvantages.

SUMMARY OF THE INVENTION

In view of the above disadvantages of the prior art, the present invention provides a system and a method for processing packets, ensuring successful delivery of multimedia multicast packets transmitted by remote servers to all members in the multicast group of an access point.

The present invention further provides a packet processing system and its method to dynamically adjust the transmission rate at which the access point transmits the multimedia streaming multicast packets sent by the remote servers to different members within a multicast group.

In one embodiment, the packet processing system is used for a network packet forwarding device having information of members in the multicast group in the network in which the network packet forwarding device is located, and the packet processing system includes a packet receiving module for receiving packets transmitted from an external device; a packet replication module for replicating the packets received by the packet receiving module, wherein the number of packet replications is determined based on the number of members in the multicast group; a packet modification module for replacing each of destination addresses in frame headers of a media access control of each of the packets replicated by the packet replication module with an address information of each of the members in the multicast group; and a packet transmission module for transmitting the packets, according to the destination addresses, to a packet receiving terminal having an address corresponding to the destination addresses.

In another embodiment of the packet processing system in the present invention, the packet transmission module further waits to receive a packet received acknowledgement message sent back by the packet receiving terminal, in which if the packet received acknowledgement message is not received, frequency down conversion is applied in the packet receiving terminal and then the packet is retransmitted to the packet receiving terminal at a transmission rate after the frequency down conversion, and the frequency down conversion and packet retransmission are repeated until the packet received acknowledgement message is received. Further, the transmission rate after frequency down conversion is served as a basis for the packet receiving terminal in which the frequency down conversion is applied to receive further packets A packet processing method of the present invention is used for a network packet forwarding device having information of members in the multicast group in the network in which the network packet forwarding device is located, and the packed processing method includes the steps of: receiving packets transmitted from external devices; determining the number of packets to be replicated according to the number of the members in the multicast group; replacing each of destination addresses in frame headers of a media access control of each of the replicated packets with an address information of each of the members in the multicast group; and transmitting the packets, according to the destination addresses, to a packet receiving terminal having an address corresponding to the destination addresses.

In another embodiment of the packet processing method of the present invention, after transmitting the packets, according to the destination addresses, to a packet receiving terminal having an address corresponding to the destination addresses, the network packet forwarding device waits to receive a packet received acknowledgement message sent back by the packet receiving terminal, wherein if the packet received acknowledgement message is not received, frequency down conversion is applied in the packet receiving terminal and then the packet is retransmitted to the packet receiving terminal at a transmission rate after the frequency down conversion, and the frequency down conversion and packet retransmission are repeated until the packet received acknowledgement message is received. In addition, the packet processing method of the present invention includes the step of receiving further packets based on the transmission rate after frequency down conversion by the packet receiving terminal in which the frequency down conversion is applied.

In accordance with the present invention, the packet processing system and method according to the present invention converts the multimedia streaming multicast packets to the multimedia streaming unicast packets. The network packet forwarding device transmits the multimedia unicast packets to different members of the multicast group in the network in which the network packet forwarding device is located. This ensures that the network packet forwarding device successfully delivers the multimedia streaming multicast packets sent by the packet transmitting terminal such as the remote server to members of the multicast group. Also, the packet processing system and the method of the present invention adjust the rate at which different members in the multicast group of the network packet forwarding device receive the multimedia unicast packet sent by the network packet forwarding device. Hence, the present invention achieves dynamic adjustment of the rate at which the network packet forwarding device delivers the multimedia streaming multicast packets to different members, thus ensuring the transmission quality of multimedia packets.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
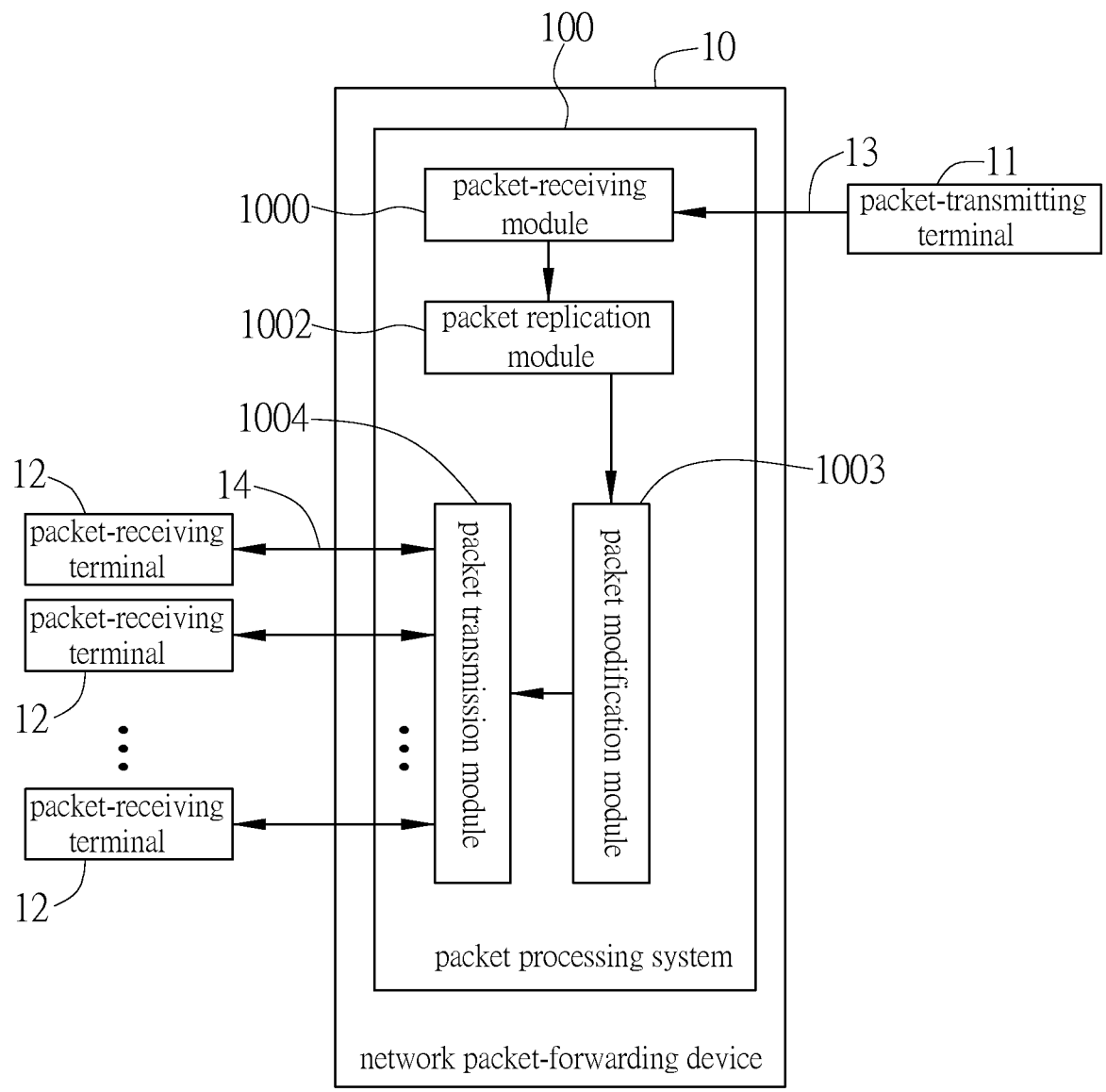
FIG. 1 shows a block diagram of a packet processing system in accordance with an embodiment of the present invention.

FIG. 1 is a block diagram illustrating modules within the packet processing system of the present invention and the relationship between these modules and other external devices. As shown in FIG. 1, a packet processing system 100 is responsible for the packet forwarding mechanism on a network packet forwarding device 10, which is, for example, a modem, a router, a bridge, a hub, an IP share machine or an access point. In one embodiment, the network packet forwarding device 10 is, but not limited to, the access point. The packet processing system 100 includes a packet receiving module 1000, a packet replication module 1002, a packet modification module 1003, and a packet transmission module 1004.

The packet receiving module 1000 receives the packets sent by a packet transmitting terminal 11 via a telecommunications connection 13, wherein the telecommunications connection 13 is either a wired telecommunications connection or a wireless telecommunications connection such as microwave, far infra red rays and etc. for the packet receiving module 1000 to receive packets. These packets are multipoint transmission packets such as broadcast or multicast packets. The packet receiving module 1000 can also receive unicast packets. In the present embodiment, the packet receiving module 1000 receives multimedia streaming multicast packets.

The packet replication module 1002 replicates a multimedia streaming multicast packet, and the number of the replicated multicast packets is determined based on the number of members of the multicast group in the network packet forwarding device 10.

The packet modification module 1003 changes the content of the packets replicated by the packet replication module 1002, wherein the content of the packet is changed based on the default value, user defined setting or the address of a member of a multicast group. In one embodiment, the packet modification module 1003 replaces each of destination addresses in frame headers of a media access control of each of the packets replicated by the packet replication module with an address information of each of the members in the multicast group, so that a multimedia streaming unicast packet is formed.

The packet transmission module 1004 transmits the packets converted by the packet modification module 1003 via a telecommunications connection 14 to all members in the multicast group, i.e. a plurality of packet receiving terminals 12. Since the packet replication module 1002 replicates the multicast packets in accordance with the number of members of the multicast group in the network packet forwarding device 10, the packet transmission module 1004 then transmits, using the one to one method, the multicast packets to packet receiving terminals 12. In other words, the network packet forwarding device 10 transmits packets to the packet receiving terminals 12 via a unicast manner. In addition, since the address of each individual packet receiving terminal 12 is added to the header of the unicast packet by the packet modification module 1003, the packet receiving terminal 12 transmits back a packet received acknowledgement message via the telecommunications connection 14 after receiving packets from the packet transmission module 1004. The acknowledgement message informs the packet transmission module 1004 that the packets have been received. The telecommunications connection 14 connects the wireless network via microwave, far infrared rays and etc. for the packet transmission module 1004 to transmit packets to each packet receiving terminal 12. Besides, The packet receiving terminal 12 may be another network packet forwarding device or a data terminal equipment (DTE) such as a client computer. According to the present embodiment, the packet transmission module 1004 delivers a multimedia streaming unicast packet to the client computer or the packet receiving terminal 12 of another network packet forwarding device via the wireless telecommunications connection 14 such as microwave or far infrared rays. The packet receiving terminal 12 then transmits back a packet received acknowledgement message via the wireless telecommunications connection 14, so as to inform the packet transmission module 1004 that the packets have been received. Accordingly, the network packet forwarding device 10 (such as an access point) then delivers the multimedia streaming multicast packets sent by the remote server to all members of the multicast group.

In addition, according to another embodiment of the present invention, the packet transmission module 1004 further regulates the transmission rate. When the packet transmission module 1004 does not receive the packet received acknowledgement message from the packet receiving terminal 12, it is possibly due to that the distance between the packet receiving terminal 12 and the network packet forwarding device 10 is too long, thereby causing packet loss during the packet transmission. Therefore, the packet transmission module 1004 then lowers the packet transmission rate, such that the packet is retransmitted at an adjusted packet transmission rate to the packet receiving terminal 12 that fails to send back the packet received acknowledgement message. If the packet transmission module 1004 still does not receive the packet received acknowledgement message from the packet receiving terminal 12 even after the packet transmission module 1004 applies frequency down conversion to transmit packets to the packet receiving terminal 12, the packet transmission module 1004 will continue the frequency down conversion and retransmit the packets to the packet receiving terminal 12 at further transmission rate obtained from the frequency down conversion until the packet received acknowledgement message is received. Next, once the packet transmission module 1004 receives the acknowledgement message, a transmission rate at which next multimedia streaming unicast packets are transmitted to the packet receiving terminal 12 is adjusted to the transmission rate at which the multimedia streaming unicast packets have been transmitted. Therefore, the present invention provides instantaneous and dynamic regulation of the transmission rates at which the multimedia streaming multicast packets sent by the packet transmitting terminal 11 are transmitted from the network packet forwarding device 10 to different members of the multicast group.

Figure 2:
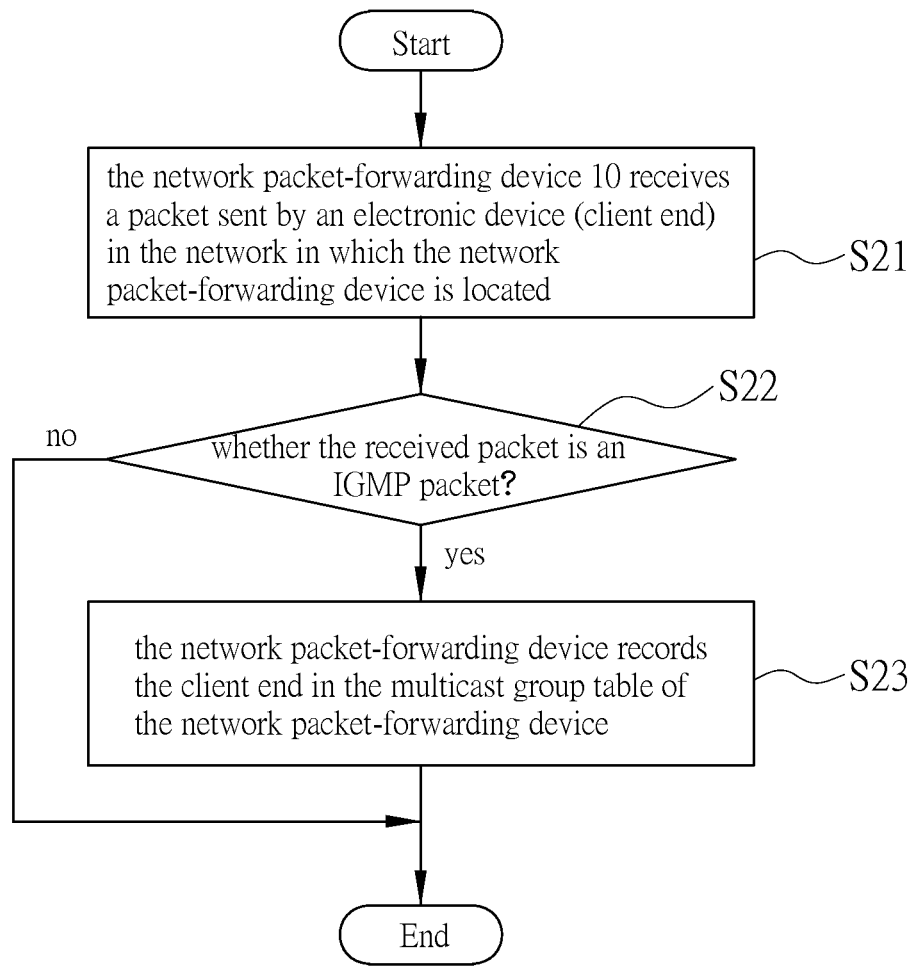
FIG. 2 shows a flow chart of the operations prior to executing the packet processing method of an embodiment of the present invention.

FIG. 2 shows the step prior to the execution of the packet processing method of the present invention. The step involves the network packet forwarding device 10 (i.e. access point) registering the information of all members (client end) of a particular multicast group in the network in which the network packet forwarding device 10 is located. The above mentioned step is set the multicast groups of the network packet forwarding device 10.

As shown in FIG. 2, the network packet forwarding device 10 receives a packet sent by an electronic device (client end) in the network in which the network packet forwarding device 10 is located.

In step S22, the network packet forwarding device 10 judges whether the received packet is an IGMP (Internet Group Management Protocol) packet. If the packet is an IGMP packet, then proceed to step S23; otherwise terminate the step of setting the multicast group.

In step S23, the network packet forwarding device 10 categorizes the electronic device that sends the IGMP packets as a member (client end) of the multicast group registered in the network packet forwarding device 10, and records the electronic device that sends the IGMP packets in the multicast group table of the network packet forwarding device 10.

According to the above steps, the number of members as well as the member information added to the multicast group registered in the network packet forwarding device are obtained. After setting the multicast group, the packet processing method of the present invention is carried out.

Figure 3:
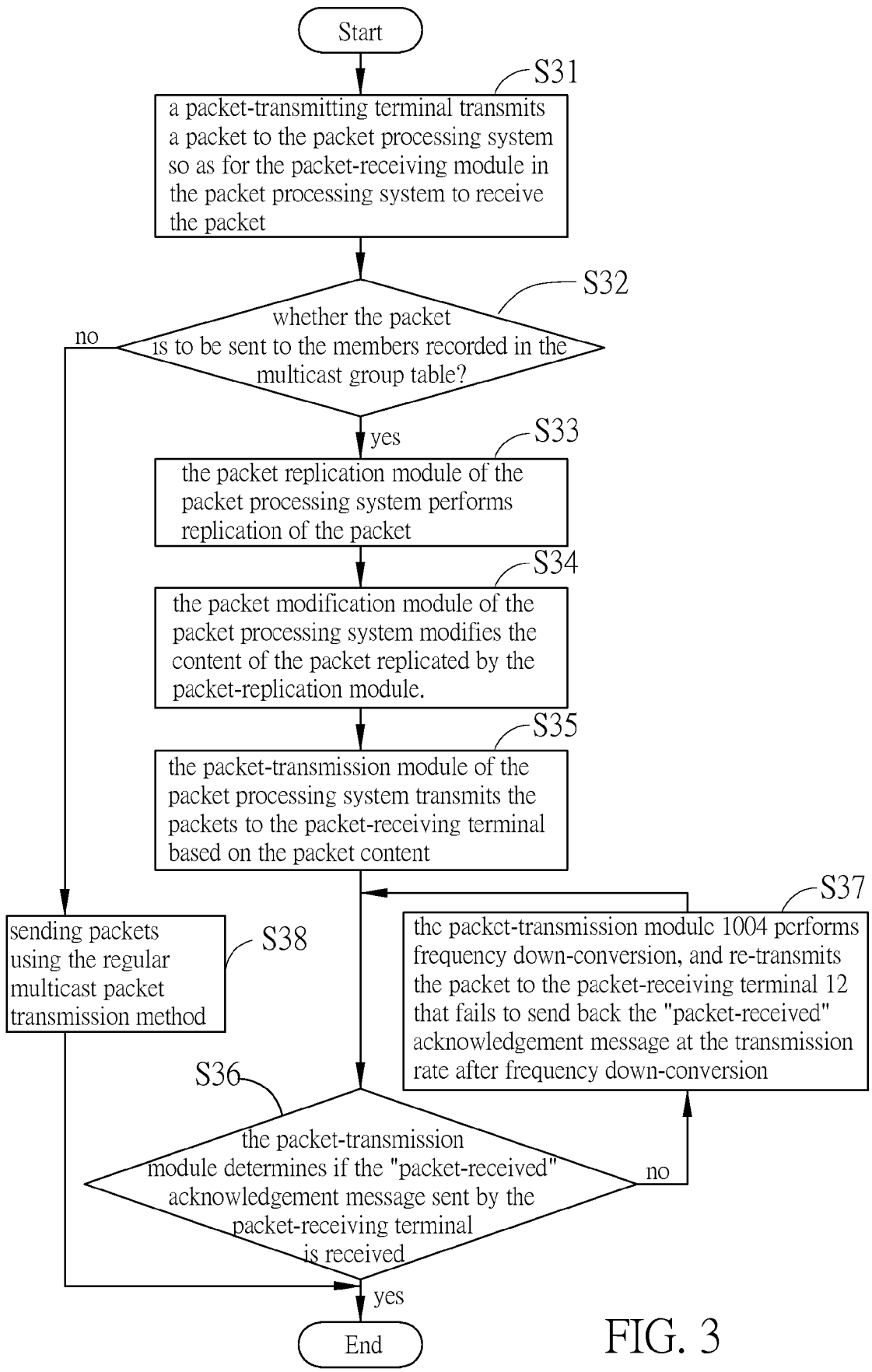
FIG. 3 illustrates an operation flow chart for packet processing method of an embodiment of the present invention.

FIG. 3 illustrates an operation flow of the packet processing method according to the present invention As shown in FIG. 3, in step 31, the packet transmitting terminal 11 transmits a packet to the network packet forwarding device 10 having the packet processing system 100 so as for the packet receiving module 1000 in the packet processing system 100 to receive the packets sent by the packet transmitting terminal 11. According to the present embodiment, the packet receiving module 1000 of the packet processing system 100 receives the multimedia streaming multicast packets. The network packet forwarding device 10 is, for example, a modem, a router, a bridge, a hub, an IP share machine or an access point. According to the present embodiment, a multimedia streaming multicast packet is sent by an ADSL (Asymmetric Digital Subscriber Line) modem to the access point having the packet processing system 100.

In step S32, the packet receiving module 1000 judges whether the multicast packet received is to be sent to the members recorded in the multicast group table of the network packet forwarding device 10. If so, proceed to step S33, otherwise, execute step S38 to send the packets using the regular multicast packet transmission method.

In step S33, the packet replication module 1002 of the packet processing system 100 performs replication of the packet, wherein the packet replication module 1002, according to the default value or the multicast group table established in step S23, obtains the number of the members of the multicast group. The number obtained is used as a basis for determining the number of packet replications. In the present embodiment, the packet replication module 1002 obtains the number of members of the multicast group according to step S23 to determine the number of packet replications. The above is then followed by step S34.

At step S34, the packet modification module 1003 of the packet processing system 100 modifies the content of the packet replicated by the packet replication module 1002, wherein the packet modification module 1003, according to the default value or the multicast group table established in the step as outlined in FIG. 2, obtains the information of the member added to the multicast group. The information obtained is used as a basis for modifying the packet content. In the present embodiment, the packet modification module 1003 replaces each of destination addresses in frame headers of a media access control (MAC) of each of the multimedia streaming multicast packets replicated by the packet replication module 1002 with an address information of each of the members in the multicast group All replicated multimedia streaming multicast packets are further converted to multimedia streaming unicast packets, and then step S35 is carried out.

In step S35, the packet transmission module 1004 of the packet processing system 100 transmits the packets to the packet receiving terminal 12 based on the packet content. In the present embodiment, as the packet modification module 1003 replaces the destination address of every multimedia streaming multicast packet replicated by the packet replication module 1002 with the address of every member in the multicast group. The packet transmission module 1004 then delivers the packet according to the destination address of the multimedia unicast packet to the packet receiving terminal 12 corresponding to the destination address field. The packet receiving terminal 12 is, for example, a modem, a router, a bridge, a hub, an IP share machine, an access point or a client computer.

In step S36, the packet transmission module 1004 waits to receive the "packet received" acknowledgement message sent by the packet receiving terminal 12 in response to receiving the multimedia streaming unicast packet. By checking whether the "packet received" acknowledgement message is received, it is determined whether every packet receiving terminal 12 receives the packets sent by the packet transmission module 1004. If the packet transmission module 1004 receives the "packet received" acknowledgement message sent back by all the packet receiving terminals 12, the operation flow of the packet processing method according to the present invention is terminated. Otherwise, when the packet transmission module 1004 does not receive the "packet received" acknowledgement message sent back by the packet receiving terminals 12, proceed to step S37.

In step S37, the packet transmission module 1004 performs frequency down conversion targeted at the packet receiving terminal 12 that fails to receive the "packet received" acknowledgement message, and retransmits the packet to the packet receiving terminal 12 that fails to send back the "packet received" acknowledgement message at the transmission rate after frequency down conversion. Next, step S36 is carried out for the packet transmission module 1004 to continue deciding whether all packet receiving terminals 12 successfully send back the "packet received" acknowledgement message. The packet transmission module 1004 performs frequency down conversion in response to the packet receiving terminal 12 that fails to send back the "packet received" acknowledgement message until the "packet received" acknowledgement message sent back by the packet receiving terminal 12 is received. In addition, the packet transmission rate after frequency down conversion obtained will serve as a basis for the packet transmission rate at which the packet receiving terminal 12 receives packets sent by the packet transmission module 1004 at the packet transmission rate derived from the next frequency down conversion In summary, the system and method for processing packets according to the present invention ensure that the network packet forwarding device (Access Point) delivers the multimedia streaming multicast packets to the members of the multicast group. Also, according to another embodiment of the present invention, the transmission rate at which the multimedia streaming unicast packets are transmitted to the packet receiving terminal 12 is adjusted such that instantaneous and dynamic adjustment of the transmission rate at which the network packet forwarding device 10 (access point) transmits the multimedia streaming multicast packet sent by the remote servers (packet receiving terminal) to different members of the multicast group registered in the network packet forwarding device 10.

The foregoing embodiments and advantages are merely exemplary and are not to be construed as limiting the present invention. It will be understood that variations and modifications can be effected thereto by those skilled in the art without departing from the spirit and scope of the invention as defined by the appended claims.

What is claimed is:

1. A packet processing system for a network packet forwarding device having information of members in a multicast group in a network in which the network packet forwarding device is located, comprising:
    a packet receiving module for receiving a packet;
    a packet replication module, coupled to the packet receiving module, for replicating the received packet into a plurality of replicated packets according to a number of members in the multicast group;
    a packet modification module, coupled to the packet replication module, for converting the plurality of replicated packets into a plurality of unicast packets by replacing a destination address in a frame header of a media access control (MAC) of each of the plurality of replicated packets with an address information of each of the members in the multicast group; and
    a packet transmission module, coupled to the packet modification module, for transmitting the unicast packets to a plurality of packet receiving terminals having addresses corresponding to the replaced destination addresses,
    wherein the packet transmission module further waits for a packet received acknowledgement message from at least one of the plurality of packet receiving terminals, wherein when the packet received acknowledgement message is not received, the unicast packets are retransmitted at a lower transmission rate, and repeat lowering the transmission rate until the packet received acknowledgement message is received, wherein a lowered transmission rate for the at least one of the plurality of packet receiving terminals is lower than another transmission rate for a different one of the plurality of packet receiving terminals.

2. The packet processing system of claim 1, wherein the received packet is a multimedia streaming packet.

3. The packet processing system of claim 1, wherein the received packet is a multipoint transmission packet.

4. The packet processing system of claim 3, wherein the multipoint transmission packet is a multicast packet.

5. The packet processing system of claim 4, wherein the packet modification module replaces a content of each the replicated multipoint transmission packets with a content of a unicast packet.

6. The packet processing system of claim 1, wherein the packet replication module further provides a default replication number to determine a number of packet replications.

7. The packet processing system of claim 1, wherein the lower transmission rate is served as a basis for the at least one of the plurality of packet receiving terminals to receive further packets.

8. The packet processing system of claim 1, wherein the network packet forwarding device is a modem, a router, a bridge, a hub, an Internet Protocol (IP) share machine, a wireless access point, or a client computer.

9. The packet processing system of claim 1, wherein the plurality of packet receiving terminals are members of the multicast group and are configured for receiving multicast packets.

10. A packet processing method for a network packet forwarding device having information of members in a multicast group in a network in which the network packet forwarding device is located, comprising the steps of:
    receiving a packet;
    replicating the received packet into a plurality of replicated packets according to a number of the members in the multicast group; converting the plurality of
    replicated packets into a plurality of unicast packets by replacing a destination address in a frame header of a media access control (MAC) of each of the replicated packets with an address information of each of the members in the multicast group;
    transmitting the unicast packets to a plurality of packet receiving terminals having addresses corresponding to the replaced destination addresses, and
    waiting for a packet received acknowledgement message from at least one of the plurality of packet receiving terminal,
    wherein the step of waiting for a packet received acknowledgement message from the at least one of the plurality of packet receiving terminals comprises when the packet received acknowledgement message is not received, the unicast packets are retransmitted to the at least one of the plurality of packet receiving terminals at a lower transmission rate, and repeat lowering the transmission rate until the packet received acknowledgement message is received, wherein a lowered transmission rate for the at least one of the plurality of packet receiving terminals is lower than another transmission rate for a different one of the plurality of packet receiving terminals.

11. The packet processing method of claim 10, wherein the received packet is a multimedia streaming packet.

12. The packet processing method of claim 10, wherein the received packet is a multipoint transmission packet.

13. The packet processing method of claim 12, wherein the multipoint transmission packet is a multicast packet.

14. The packet processing method of claim 13, wherein the network packet forwarding device replaces a content of the multipoint transmission packet with a content of a unicast packet.

15. The packet processing method of claim 10, wherein the network packet forwarding device further provides a default replication number to determine a number of packet replications.

16. The packet processing method of claim 10, further comprising the steps of: receiving further packets based on the lower transmission rate.

17. The packet processing method of claim 10, wherein the network packet forwarding device is a modem, a router, a bridge, a hub, an Internet Protocol (IP) share machine, a wireless access point, or a client computer.

18. The packet processing method of claim 10, wherein the plurality of packet receiving terminals are members of the multicast group and are configured for receiving multicast packets.

* * * * *